United States Patent [19]

Depaepe

[11] Patent Number: 5,144,657
[45] Date of Patent: Sep. 1, 1992

[54] HAND TEST SET WITH STRAIN RELIEF WIRE CHANNEL

[75] Inventor: Jean-Francois Depaepe, Asnieres, France

[73] Assignee: S.A. Henri Depaepe, Colombes, France

[21] Appl. No.: 738,450

[22] Filed: Jul. 31, 1991

[51] Int. Cl.⁵ .................. H04M 1/03; H04M 1/15
[52] U.S. Cl. ............................. 379/433; 379/438; 379/21
[58] Field of Search ................. 379/21, 428, 433, 438

[56] References Cited

U.S. PATENT DOCUMENTS 3,444,329  5/1969  Krumreich .................. 379/438
3,792,205  2/1974  O'Dea ......................... 379/21

Primary Examiner—Stafford D. Schreyer
Attorney, Agent, or Firm—Michael J. Lennon

[57] ABSTRACT

A hand held telephone test set includes an internal strain relief interface configuration. The interface includes a well structure formed in a housing of the test set, with a plug receptacle disposed in the well structure. Additionally, a plug line channel is disposed in the housing and receives a plug line associated with a plug connected to the plug receptacle. The channel has a shape that provides strain relief for the plug/receptacle connection and the connecting line/plug connection.

21 Claims, 2 Drawing Sheets

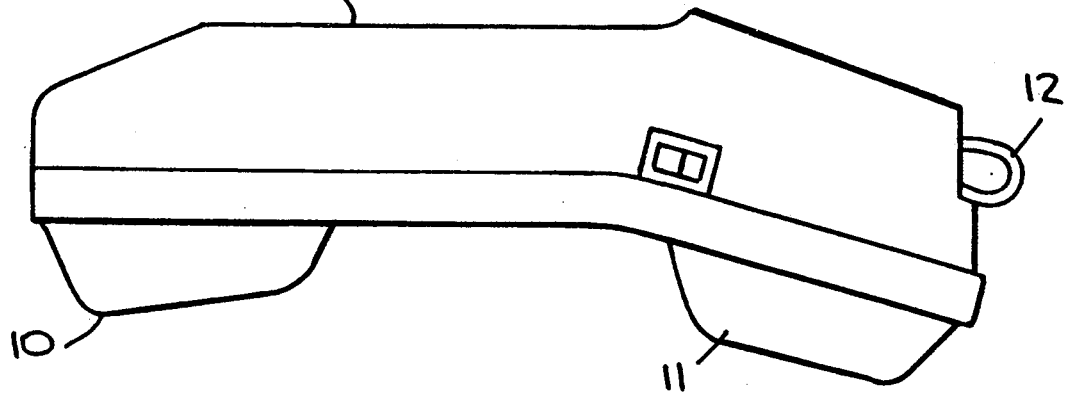
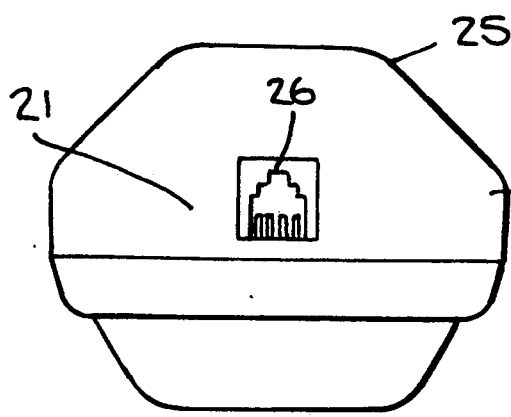
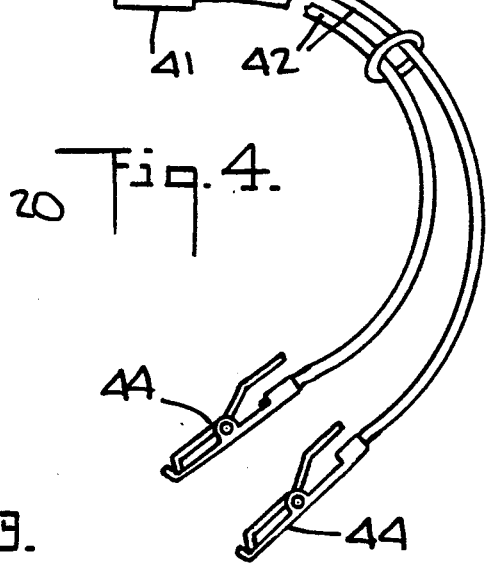
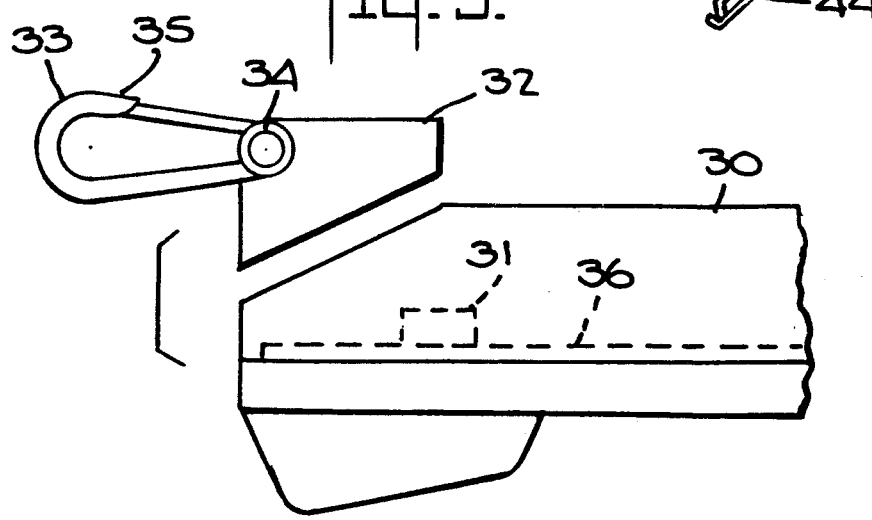

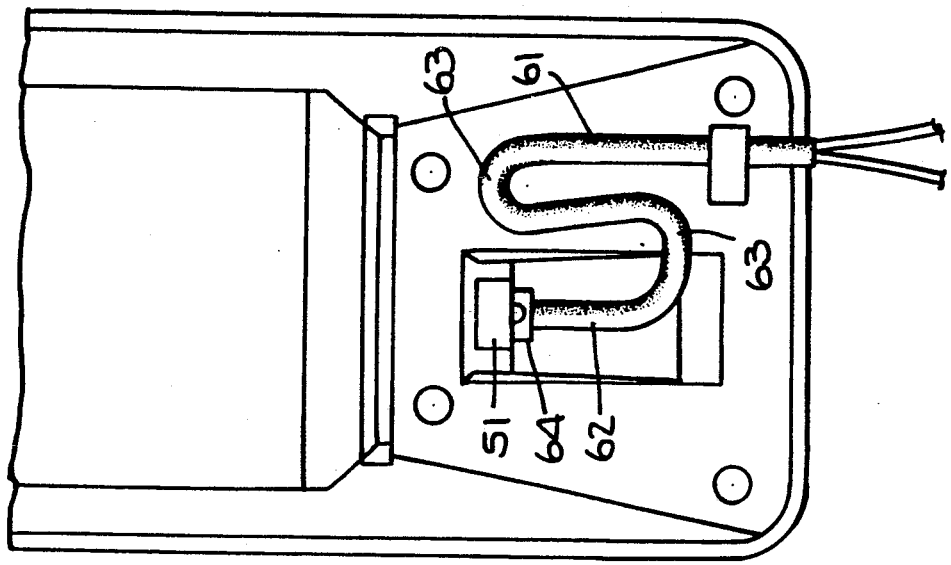
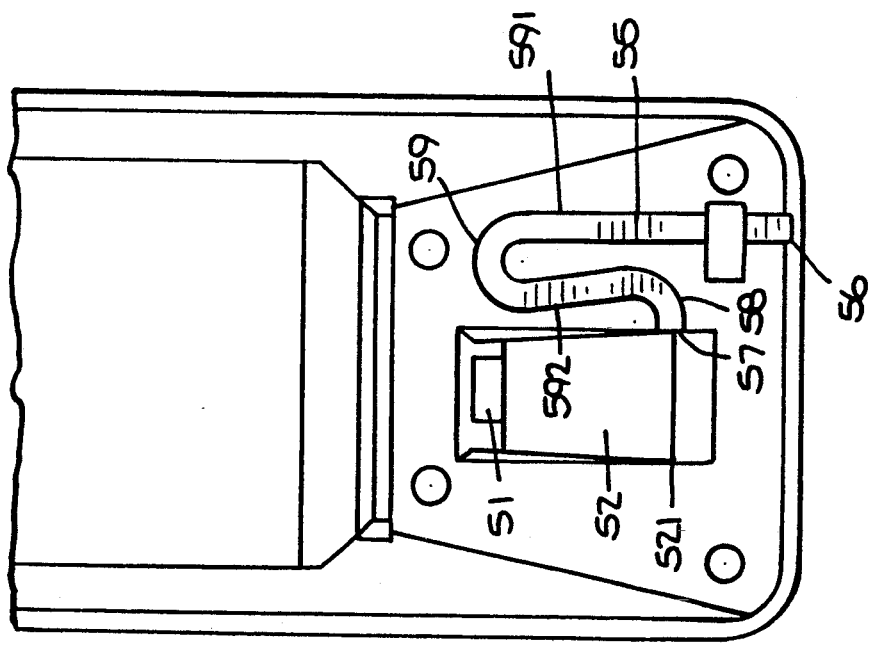

HAND TEST SET WITH STRAIN RELIEF WIRE CHANNEL

BACKGROUND OF THE INVENTION

The present invention is directed to a hand test set and in particular to a test set having a channel receiving a connecting line, wherein the channel has a structure that provides strain relief at a connection of a connecting line and an input/output interface of the test set.

A telephone test set must provide an input/output interface, i.e., a connection point whereby a transmitter and/or a receiver and related electronic circuits of the telephone test set can be connected to a telephone line or network to be tested. A receptacle can be provided as the input/output interface The receptacle is designed to receive a standard telephone line-plug to which connecting lines are coupled. One such standard receptacle is adapted to receive an RJ-11 modular plug. Such a plug/receptacle configuration provides for easy connection and disconnection of a given connection line to the hand test set. In one test set, the input/output interface is a receptacle which is disposed along an outer perimeter of a casing of the test set. The receptacle or jack for the RJ-11 plug is provided in this position.

Despite the accessibility of the plug-receptacle connection and the ease with which it can be changed, there are disadvantages in this configuration. The RJ-11 modular plug provides a weak connection in the sense that it is susceptible to damage from mechanical strain. When mechanical strain is applied to the connecting line connected to the plug, the plug can become disengaged from the receptacle and/or the connecting line can be disengaged from the plug. Occurrences of line strain are common in the use of hand test sets, given the frequency of use and the environment in which they are used, i.e., field testing of telephone lines and network equipment.

SUMMARY OF THE INVENTION

The present invention provides a unique interface configuration for a telephone test set. In this configuration, a plug receptacle and a connecting line are arranged to compensate for strain and prevent damage to the connecting line or accidental disconnection of the plug from the receptacle due to an occurrence of strain.

In an embodiment of the present invention, an RJ-11 plug and the receptacle for that plug are the interfaces between a telephone test set and a connecting line. A well structure or recessed portion is provided in the housing of the test set of the present invention. The receptacle for the RJ-11 plug is provided in the well or recessed structure. A channel is positioned adjacent to the well structure. The channel receives the connecting line which is coupled to the RJ-11 plug. The channel is configured to provide strain relief, thereby protecting both the connection of the plug to the connecting line and the connection of the plug to the receptacle from damage due to occurrences of strain along the connecting line.

The channel may have a serpentine shape in a more detailed embodiment.

The embodiment of the test set may further include a plate cover disposed over the well structure and the channel to enclose the plug/jack combination and the connecting line. This enhances the protection of the connection between the plug and the receptacle, as well as the connection of the plug and the connecting line and maintains the position of the connecting line.

The plate cover may include a pivot to which a snap hook may be connected. The snap hook, which is adapted to form a support clip for attaching the test set to a support element such as a tool belt, may be rotatable about the pivot.

BRIEF DESCRIPTION OF THE DRAWINGS

FIG. 1 illustrates a side view of a prior test set.

FIG. 2 illustrates a front side portion of the test set of FIG. 1, showing an interface configuration for such a set.

FIG. 3 illustrates a partial side view of a hand test set in accordance with an embodiment of the present invention.

FIG. 4 illustrates a connecting line and plug to be used in connection with the hand set of FIG. 2.

FIG. 5 illustrates a top view of a portion of the hand test set of the FIG. 2 with a cover plate of the hand test set removed.

FIG. 6 is the illustration of FIG. 5 showing the connecting line and plug in place.

DETAILED DESCRIPTION

FIG. 1 illustrates a side view of a prior test set. The set includes a housing 15 which has a voice receiving portion, such as a microphone, 10 and an audio sound producer, such as a speaker, 11. A belt clip 12 is provided along an outer perimeter of the housing 15.

FIG. 2 illustrates the interface area of the test set of FIG. 1, including a known plug receptacle. The receptacle 20 is provided along an outer perimeter 21 of the housing 25 of the test set. The receptacle is adapted to receive a connecting plug connected to a connecting line, such as a RJ-11 plug. The RJ-11 plug includes a resilient plastic portion which engages a slot 26 in the receptacle and snaps the plug into a locked position in the receptacle. However, this plug/receptacle configuration is susceptible to strain on the connecting line connected to the RJ-11 plug. As a consequence, either the connection of the connection line to the plug might be disrupted, or the RJ-11 plug might be disconnected from the receptacle depending upon the extent of strain applied to the connecting line.

FIG. 3 illustrates a partial side exploded view of the housing of a hand test set according to an embodiment of the present invention. A housing 30 includes a receptacle 31 for a line plug such as a RJ-11 plug. The receptacle 31 is mounted on a printed circuit board 36. This is all disposed within the housing 20. A housing cover plate 32 is provided above the region in which the receptacle is disposed The cover plate 32 includes a belt clip 33 which is constituted by a snap hook 35 mounted on a pivot 34 for rotation about the pivot on the cover plate. The belt clip is connectable to a tool carrier or tool belt used by a typical operator of a hand test set.

FIG. 4 illustrates a typical connecting line with a plug to be used with the hand test set of the present invention. The plug 41 is an RJ-11 plug to which are connected two connecting lines 42. The plug includes a plurality of interface wires 43. This plug is insertable into the receptacle in the housing of the hand test set of the present invention. When inserted, the interface wires are brought into contact with corresponding receptacle interface wires (not shown). The connecting lines may have connection clips 44, such as alligator clips, for selectively connecting the connecting lines 42 to a telephone line or network.

FIG. 5 illustrates a top view of the hand test set of FIG. 3 with the cover plate 32 removed. The receptacle 51 is disposed in a well or recessed portion 52 formed in the housing 43 of the device. The well is formed along a slanted face of the housing with a depth ranging from one end of the well to the other of approximately 0.25 to 0.625 inches. The well is slightly sloped from its front portion 521 closest to the side portion of the hand test set down toward the receptacle. A serpentine channel 55 is adjacent to the well The serpentine channel has an entry point 56 and an exit point 57. The serpentine channel is adapted to receive a connecting line associated with an RJ-11 plug which is inserted into the receptacle disposed in the well. The channel configuration provides strain relief for the connecting line and the plug when a connection is provided to the receptacle. The serpentine channel consists of two arc portions 58 and 59 and two substantially straight line portions 591 and 592.

FIG. 6 illustrates the receptacle and serpentine channel configuration of an embodiment of the present invention with a plug and connecting line inserted The connecting line 61 is disposed in the serpentine channel and has, by its placement in the channel, three substantially parallel straight line segments 62, and two arc portions 63. The channel may be sized to be approximately the same width as the connecting line. The plug 64 is inserted into the receptacle along a direction of motion that is substantially parallel to a plane formed by the bottom or floor of the well structure. This direction is also substantially parallel to a plane in which the serpentine channel is disposed. The latter plane is higher on the housing body than the plane of the floor of the well structures The arc portions of the serpentine channel result in strain relief on the connecting line and the plug when strain is applied to the connecting line at a position external of the housing input portion of the serpentine channel.

The plate cover illustrated in FIG. 2 is removed from the housing to permit connection of the plug and receptacle as well as placement of the connecting line into the serpentine channel After this arrangement is made, the plate cover is connected by four symmetrically disposed screw connectors to the housing body of the test set above the receptacle and serpentine shaped channel. This encloses the plug connected to the receptacle and the connecting line disposed in the serpentine channel. This enhances the stability of the connecting line and plug/receptacle configuration.

As a result of the above described line interface configuration, the present invention provides enhanced device characteristics in the face of line strain by providing internal strain relief for the connecting line and the plug/receptacle connection.

It is possible to provide additional arc sections and straight line portions to further enhance the strain relief. Additionally, placement of the respective arcs along the serpentine channel can be adjusted so as to adjust the strain relief obtained.

Different channel configurations, other than serpentine, are possible, so long as the channel includes a configuration which produces a non-linear segment in the connecting line.

Furthermore, alternative plug/receptacle combinations can be provided.

What is claimed is:

1. In a craft hand test set for testing telephone lines, including a signal transmitter and a signal receiver and line connector receptacle for accepting a line connector through which said signal transmitter and signal receiver can be connected to a telephone line, the improvement comprising:
    a channel disposed in said test set, said channel receiving a line connected to the line connector, said channel holding the line when the line connector is connected to said line connector receptacle and having a shape that reduces effects of strain on the connecting line.

2. The hand test set of claim 1 wherein said channel has a serpentine shape.

3. The hand test set of claim 2 wherein said serpentine channel comprises a plurality of arc shaped portions connected to one another by at least one straight line portion, wherein the line connected to the line connector, when disposed in said serpentine channel, includes at least three substantially straight line portions extending substantially parallel to one another and separated by said plurality of arc shaped portions.

4. The hand test set of claim 3 wherein said receptacle is disposed adjacent to a first one of said plurality of arc portions 5. The hand test set of claim 1 wherein the line connector is inserted into said receptacle in a direction of motion along a plane substantially parallel to a plane in which said channel is disposed.

6. The hand test set of claim 3 wherein the line connector is inserted into said receptacle in a direction of motion along a plane substantially parallel to a plane in which said serpentine channel is disposed.

7. A telephone test set comprising:
    a housing;
    a transmitter and a receiver and related electronic components disposed within said housing;
    a recessed portion formed in said housing;
    a receptacle, providing a connection point to external lines for said transmitter and receiver, said receptacle being disposed in said recessed portion; and
    a strain relief channel, adapted to receive a line of a line connector connected to said receptacle.

8. The hand test set of claim 7 wherein said channel has a serpentine shape.

9. The hand test set of claim 8 wherein said serpentine channel comprises a plurality of arc shaped portions connected to one another by at least one straight line portion, wherein the line, when disposed in said serpentine channel has at least three substantially straight line portions extending substantially parallel to one another and separated by said plurality of arc shaped portions.

10. The hand test set of claim 9 wherein said receptacle is disposed adjacent to a first one of said plurality of arc portions.

11. The hand test set of claim 7 wherein the line connector is inserted into said receptacle in a direction of motion along a plane substantially parallel to a plane in which said channel is disposed.

12. The hand test set of claim 9 wherein the line connector is inserted into said receptacle in a direction of motion along a plane substantially parallel to a plane in which said serpentine channel is disposed 13. The hand test set of claim 7 further comprising a cover plate disposed over said well structure and said channel to enclose a connector connected to said receptacle and a line disposed in said channel.

14. The hand test set of claim 8 further comprising a cover plate disposed over said well structure and said channel to enclose a connector connected to said receptacle and a line disposed in said channel.

15. The hand test set of claim 9 further comprising a cover plate disposed over said well structure and said channel to enclose a connector connected to said receptacle and a line disposed in said channel.

16. The hand test set of claim 13 wherein said cover plate includes a pivot and a snap hook connected to said pivot for rotation about said pivot 17. In a telephone test set including a transmitter and receiver and related electronic circuits disposed in a housing, an input/output interface comprising:
   a receptacle;
   a strain relief groove formed in the housing, adapted to receive a connecting line of a connector insertable in said receptacle; and
   a plate cover detachable from the housing from a position over said receptacle and said groove wherein when said plate cover is attached to the housing said receptacle and groove are substantially enclosed 18. The hand test set of claim 17 wherein said channel has a serpentine shape.

19. The hand test set of claim 18 wherein said serpentine channel comprises a plurality of arc shaped portions connected to one another by at least one straight line portion, wherein the connecting line, when disposed in said serpentine channel has at least three substantially straight line portions extending substantially parallel to on another and separated by said plurality of arc shaped portions.

20. The hand test set of claim 17 wherein the connecting line is inserted into said receptacle in a direction of motion along a plane substantially parallel to a plane in which said groove is disposed 21. The hand test set of claim 17 wherein said plate cover includes a pivot and a snap hook connected to said pivot for rotation about said pivot.

* * * * *